J. Nicholson,
Making Metal Tubing,
No. 64,246. Patented Apr. 30, 1867.
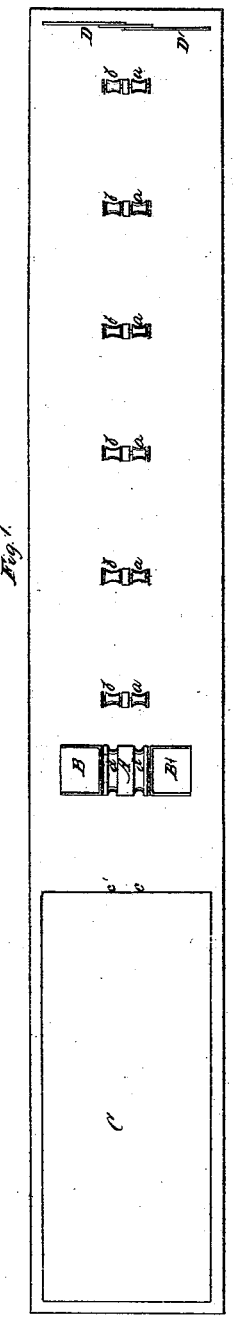
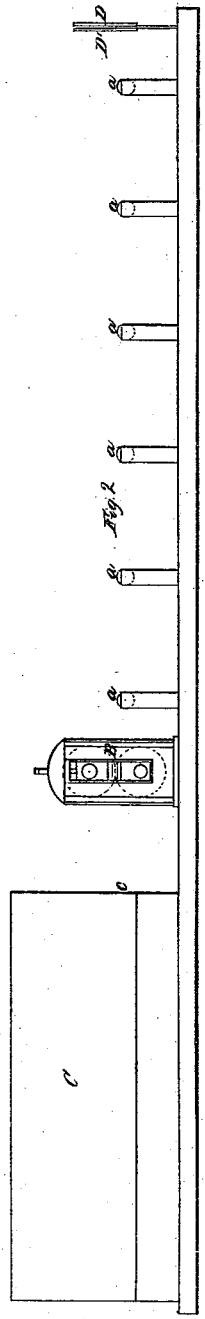
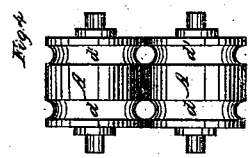
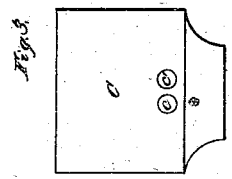
Witnesses
Francis D. Pastorius
Frank Garde
Inventor
James Nicholson

United States Patent Office.

JAMES NICHOLSON, OF PHILADELPHIA, PENNSYLVANIA.

Letters Patent No. 64,246, dated April 30, 1867.

IMPROVED APPARATUS FOR MANUFACTURING LAP-WELDED TUBES.

The Schedule referred to in these Letters Patent and making part of the same.

TO ALL WHOM IT MAY CONCERN:

Be it known that I, JAMES NICHOLSON, of the city and county of Philadelphia, and State of Pennsylvania, have invented an improved Application of Machinery for the Manufacture of Lap-Welded Boiler-Flues, and other flues, tubes, and pipes, whereby nearly twice the number of flues, tubes, and pipes can be made from the same furnace and welding rolls with the same quantity of fuel as now used; and I do hereby declare that the following is a full, clear, and exact description of the same, reference being had to the accompanying drawing, and to the letters of reference marked thereon.

My invention consists in forming two or more welding grooves, $d\ d'$, on the surfaces of a set of welding rolls, A A', for lap-welding wrought iron and other flues, tubes, and pipes, and in employing two or more gangs or trains of carrying rollers, $a\ a,\ b\ b$, etc., for conveying the flues, etc., from the welding rolls. The openings or holes in front of the furnace, for passing the tubes or flues from the furnace to the welding rolls, can be increased to the number of grooves on the rolls, else a longitudinal opening extending the length of the rolls can be substituted for them. On reference to the accompanying drawing, forming a part of this specification—

Figure 1 is a plan view, showing the lap-welded rolls A A' placed one above the other, having on their surfaces grooves, $d\ d'$, etc., (only two of which are shown,) of various sizes, according to the sizes of the tubes to be lap-welded, the heating furnace C, the gangs or trains of carrying rollers $a\ a,\ b\ b$, etc., and the stopping levers D D'.

Figure 2 is a side view of the same.

Figure 3 is a front view of the heating furnace C, showing the openings or holes, $c\ c'$, through which the heated flues, etc., are passed from the furnace to the lap-welding rolls; and Figure 4 is an enlarged view of the lap-welding rolls A A', showing the grooves $d\ d'$.

Similar letters refer to similar parts in the several views.

In the manufacture of lap-welded flues, tubes, and pipes, they are first bent to the required size for lap-welding, and then put into a furnace adjacent to the welding rolls, only one flue or tube being in the furnace at a time. After heating it is shoved by the welder through the hole in the front of the furnace into the groove in the rolls and welded. As it leaves the rolls it takes over a rod on the carrying rollers, the end of which nearest to the rolls being ball-shaped, and corresponding exactly with the internal diameter of the flue or tube. The other end of said rod buts against a stopper lever, which prevents it from moving while the flue or tube is passing over it. After it has traversed its length, the rod is withdrawn from the flue through an opening formed in the stop-lever frame on to other rollers.

It has been found by experience that a furnace cannot be worked to its capacity with a set of lap-welding rolls having but one welding groove. It is inexpedient and dangerous to heat more than one flue at a time. The instant a flue acquires a welding heat it must be passed through the rolls, else it will burn. If two are heating at once, one is certain to burn while the other is being welded. Single groove rolls entail a vast expenditure of fuel, labor, and time, as each set requires a separate furnace, with the wear and tear.

To use the heat generated in a tube furnace, above what is required for heating a single flue or tube, I heat two or more flues or tubes in the same furnace and at the same time. To weld them at the proper time, and thereby prevent them from burning, I form two or more lap-welding grooves, $d\ d'$, on the surfaces of a set of welding rolls, A A'. To convey the flues or tubes from the rolls when welded with sufficient rapidity, I use two or more gangs or trains of carrying rollers, $a\ a,\ b\ b$, etc. To accommodate the increased number of grooves on the rolls A A' and the gangs of carrying rollers, the number of holes, $c\ c'$, in the front of the furnace through which the flues or tubes are passed to the rolls should be increased to the number of grooves on the rolls, or a horizontal slot may be substituted for them. As it takes longer to bring large flues or tubes to a welding heat than small ones, the grooves on the rolls can be so varied in size that both large and small tubes can be heated in the same furnace at the same time. The small ones being first heated are shoved through the rolls without delaying for the large ones.

It will be seen that by the improvements herein described, the excess of heat generated in a welding furnace and heretofore lost is now profitably used, and the manufacture of lap-welded flues, tubes, or pipes economized by the increased number made with the same furnace and rolls.

What I claim as my invention, and desire to secure by Letters Patent, is—

In combination, a furnace with one or more openings in its front, which will admit of the simultaneous discharge of two or more heated plates or skelps, with a set of rolls having two or more welding grooves, and two or more carrying rollers, all substantially as herein described.

In testimony whereof I hereunto sign my name to this specification in presence of two subscribing witnesses.

JAMES NICHOLSON.

Witnesses:
    FRANK GARDE,
    FRANCIS D. PASTORIUS.